(12) United States Patent
Glasbrenner et al.

(10) Patent No.: US 12,356,977 B2
(45) Date of Patent: Jul. 15, 2025

(54) METHOD FOR APPLYING A SPRAY AGENT ONTO AN AGRICULTURAL AREA

(71) Applicant: Robert Bosch GmbH, Stuttgart (DE)

(72) Inventors: Jochen Glasbrenner, Stuttgart (DE); Oliver Meil, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 315 days.

(21) Appl. No.: 17/625,007

(22) PCT Filed: Sep. 4, 2020

(86) PCT No.: PCT/EP2020/074691
§ 371 (c)(1),
(2) Date: Jan. 5, 2022

(87) PCT Pub. No.: WO2021/048001
PCT Pub. Date: Mar. 18, 2021

(65) Prior Publication Data
US 2022/0287290 A1    Sep. 15, 2022

(30) Foreign Application Priority Data
Sep. 11, 2019 (DE) ..................... 10 2019 213 779.2

(51) Int. Cl.
*A01M 7/00* (2006.01)
*A01B 79/00* (2006.01)
*G06T 7/00* (2017.01)

(52) U.S. Cl.
CPC ......... *A01M 7/0089* (2013.01); *A01B 79/005* (2013.01); *G06T 7/0004* (2013.01); *G06T 2207/30188* (2013.01)

(58) Field of Classification Search
None
See application file for complete search history.

(56) References Cited

U.S. PATENT DOCUMENTS

2014/0021267 A1   1/2014   Sudduth et al.
2016/0044862 A1   2/2016   Kocer
(Continued)

FOREIGN PATENT DOCUMENTS

DE       4132637 A1   4/1993
DE   102017210804 A1   12/2018

OTHER PUBLICATIONS

International Search Report for PCT/EP2020/074691, Issued Jan. 13, 2020.

*Primary Examiner* — Joshua J Michener
*Assistant Examiner* — Henry Hooper Mudd
(74) *Attorney, Agent, or Firm* — NORTON ROSE FULBRIGHT US LLP

(57) ABSTRACT

A method is provided for applying a spray agent onto an agricultural area using a spray nozzle unit of an agricultural sprayer. The method includes: detecting a first field section using an optical detection unit to obtain a first piece of image information from the first field section; identifying plants in a first evaluation area of the first piece of image information obtained for the first field section using a control unit; ascertaining a first plant index of the first evaluation area using the plants identified in the first evaluation area using the control unit; and applying the spray agent in a defined minimum volume per unit area onto the entire first field section and onto an entire second field section adjoining the first field section in the direction of movement of the agricultural sprayer as a function of the first plant index ascertained using the spray nozzle unit.

21 Claims, 5 Drawing Sheets

(56) References Cited

U.S. PATENT DOCUMENTS

| | | | |
|---|---|---|---|
| 2021/0329906 A1* | 10/2021 | Taarnhoj | A01M 7/00 7/89 |
| 2021/0386051 A1* | 12/2021 | Seitz | A01M 7/00 7/89 |
| 2022/0256832 A1* | 8/2022 | Serrat | A01M 7/00 7/89 |
| 2022/0279699 A1* | 9/2022 | Mazzarolo | A01B 69/04 69/8 |
| 2022/0304296 A1* | 9/2022 | Chapple | A01M 7/00 7/92 |

* cited by examiner

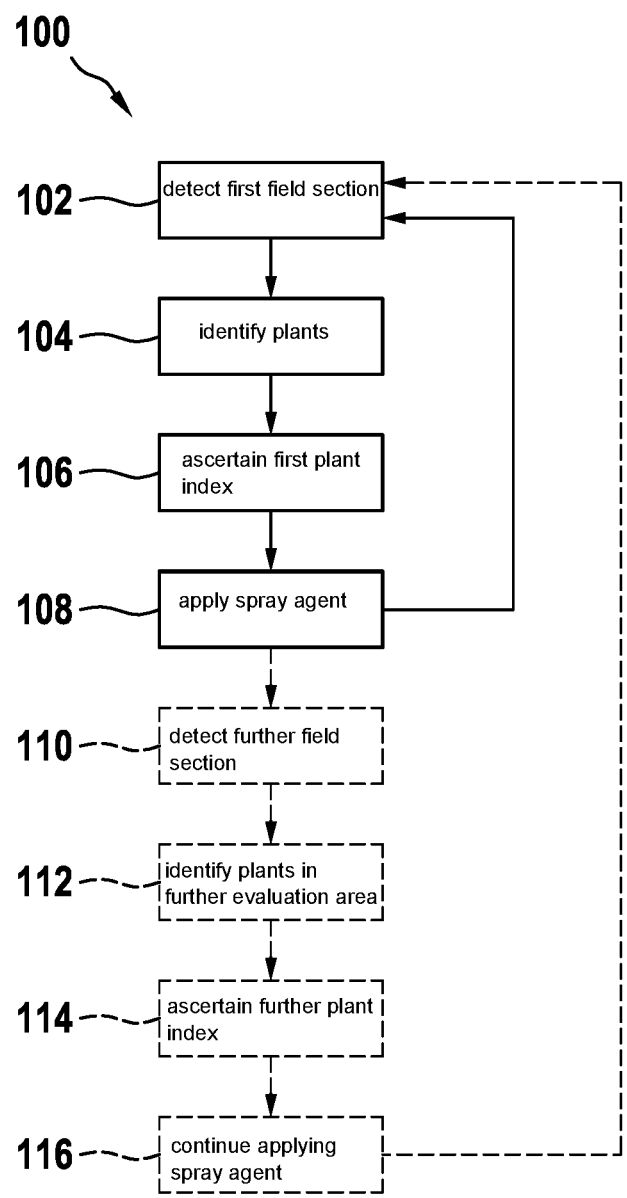

METHOD FOR APPLYING A SPRAY AGENT ONTO AN AGRICULTURAL AREA

FIELD

The present invention relates to a method for applying a spray agent onto an agricultural area with the aid of a spray nozzle unit of an agricultural sprayer, as well as to a control unit and to an agricultural sprayer for applying a spray agent.

BACKGROUND INFORMATION

Many field sprayers commercially available nowadays apply plant protection agents on the field covering a large area. In the process, a differentiation into areas that do or do not have to be treated often does not take place. Future field sprayers could carry out an application of plant protection agents as needed as a function of weed infestation. For this purpose, it is necessary during the pass over the field to be treated to carry out an evaluation of the weed infestation in real time. For the correct evaluation, specific image processing algorithms are used, which detect the weeds on the field. In addition, a contamination of the weed plant with an insufficient volume (volume shortfall) of plant protection agent, in particular, should be avoided in order not to generate additional resistances of plants to plant protection agents.

Present atomizer nozzles, with which the plant protection agent is applied on the field to be treated are characterized by the following technical variables: spray angle (exit angle of spray from the nozzle), transverse distribution (distribution of spray in the transverse direction), longitudinal distribution (distribution of spray in the direction of movement), spray depth, application volume as a function of pressure and medium, droplet spectrum, angle of rotation of the spray nozzle.

The spray depth is of particular significance for an application as needed. If the plant protection agent is extensively dispensed or a spot is sprayed with plant protection agent and, in the process, the field sprayer moves in the direction of movement, the spray must be passed over the entire spray depth in order to achieve 100% of the adjusted volume on the area. If the spray process is terminated or started, the field is treated with a volume shortfall within the spray depth. If it is assumed that the spray depth is constant, the proportion of volume shortfalls on the field becomes greater the smaller the sprayed field is in the direction of movement of the field sprayer and the more frequently the field sprayer is switched on and off. Areas of volume shortfall should, however, be avoided as mentioned above in order to avoid resistances of plants to plant protection agents.

SUMMARY

The present invention includes a method for applying a spray agent onto an agricultural area with the aid of a spray nozzle unit of an agricultural sprayer. In accordance with an example embodiment of the present invention, the method includes the steps:
  detecting a first field section of the agricultural area with the aid of an optical detection unit in order to obtain a first piece of image information from the first field section;
  identifying plants in a first evaluation area of the first piece of image information obtained from the first field section with the aid of a control unit;
  ascertaining a first plant index of the first evaluation area using the plants identified in the first evaluation area with the aid of the control unit; and
  applying the spray agent in a defined minimum volume per unit area onto essentially the entire first field section and onto an essentially entire second field section of the agricultural area adjoining the first field section in the direction of movement of the agricultural sprayer as a function of the first plant index ascertained for the first evaluation area with the aid of the spray nozzle unit of the agricultural sprayer.

The present invention also includes a control unit. In accordance with an example embodiment of the present invention, the control unit is configured to carry out and/or to control the following steps:
  identifying plants in a first evaluation area of a first piece of image information obtained from a first field section of an agricultural area detected with the aid of an optical detection unit;
  ascertaining a first plant index of the first evaluation area using the plants identified in the first evaluation area; and
  outputting a control signal to a spray nozzle unit of an agricultural sprayer as a function of the first plant index ascertained for the first evaluation area, in order to apply a spray agent in a defined minimum volume per unit area onto essentially the entire first field section and onto an essentially entire second field section of the agricultural area adjoining the first field section in the direction of movement of the agricultural sprayer.

The present invention also includes an agricultural sprayer for applying a spray agent onto an agricultural area including at least one spray nozzle unit, at least one optical detection unit and an above-described control unit.

The present invention also includes a computer program, which is configured to carry out all steps of an above-described method and/or of an above-described control unit, as well as a machine-readable memory medium on which the computer program is stored.

The method is intended for agricultural purposes. An agricultural purpose may be understood within the scope of the present invention to mean a purpose, which is directed to an economical cultivation of crop plants.

The spray agent in this case is preferably applied on an agricultural area or an area utilized for agriculture. This may be understood to mean a field or a cultivated area for plants or also a parcel of such a cultivated area. The agricultural area may thus be arable land, grassland or pasture land. The plants may include crop plants, for example, whose yield is utilized agriculturally (for example, as foodstuff, animal feed or as energy crop), as well as waste plants, weeds and grass weeds.

All steps of the method are preferably carried out during a movement, in particular, a travel or a flight of the agricultural sprayer over the agricultural area.

The agricultural sprayer is advantageously designed to carry out the method in an automated manner in order to enable a rapid, reliable and efficient treatment of a field.

The agricultural sprayer may, in particular, be designed as part of an agricultural field sprayer or of a plant protection device or as an agricultural field sprayer or a plant protection device. The agricultural sprayer may include a mobile unit or may be situated on a mobile unit, the mobile unit being capable of being designed as a farm vehicle and/or aircraft and/or trailer. The mobile unit may, in particular, be an agricultural work machine, for example, a tractor truck, a tractor, a self-driving or autonomous field sprayer or a self-driving or autonomous robot. The agricultural sprayer may, in particular, be a drawn field sprayer, a self-driving field sprayer or a cultivated field sprayer. The agricultural sprayer may also be attached to a hydraulic device of an agricultural work machine. It is also possible that the agricultural sprayer is built on a loading bed of an agricultural work machine. Alternatively, the sprayer may be hitched to the agricultural work machine. The agricultural sprayer or the field sprayer may include at least one spray agent tank for accommodating the spray agent. The agricultural sprayer or the field sprayer in this case may also include a mixing unit, which mixes (blends) a spray agent concentrate with water directly on the agricultural sprayer to form the spray agent to be applied.

The spray agent is, in particular, a spray agent liquid. The spray agent may include or be an agricultural preparation or plant protection agent (PPA), in particular, a plant protection agent concentrate. The spray agent may accordingly include a pesticide such as, for example, an herbicide, a fungicide or an insecticide. However, the spray agent may also include or be a fertilizer, in particular, a fertilizer concentrate. The spray agent in this case may include a growth regulator. The spray agent may include a granular active agent that has been mixed with a carrier fluid. The spray liquid may, for example, be designed as a: liquid, suspension, emulsion, solution or a combination thereof. The spray liquid is preferably designed as a plant protection agent diluted with water or a fertilizer diluted with water. Accordingly, the spray liquid may be a spray liquor.

The application of the spray agent may be carried out, in particular, with the aid of a delivery unit. In this case, the delivery unit may be designed to deliver or conduct, in particular, to meter a liquid and/or a granulate under pressure. Accordingly, the delivery unit may, for example, include one or multiple pumps, delivery pumps, metering pumps, pressure accumulators, screw conveyors, valves, apertures, etc.

The spray nozzle unit in each case preferably includes at least one spray nozzle for applying the spray agent and at least one valve for controlling or regulating the applied spray agent volume. Accordingly, the spray nozzle unit is designed to be controlled or actuated. The valve may be situated or integrated in the spray nozzle. The valve may, however, also be connected upstream from the nozzle, i.e., situated upstream from the spray nozzle (in the flow direction of the spray agent). The spray nozzle unit may, however, also include multiple spray nozzles each including a valve connected upstream. The spray nozzle unit may further also include multiple spray nozzles including only one valve connected upstream from the spray nozzles, so that when actuating the valve, the spray agent is dispensed with the aid of all spray nozzles of the spray nozzle unit. The valve may be designed as a pulse-width modulated valve (PWFM valve) a pulse-width frequency modulated valve (PWFM) or as a proportional valve. The spray nozzle unit may be designed as part-width of a nozzle system of the agricultural sprayer. The spray nozzle units may be activatable individually or separately and/or in defined groups or units or all together. The spray nozzles of each spray nozzle unit may be activatable individually or separately and/or in defined groups or units and/or all together.

The optical detection unit may include at least one multispectral and/or hyperspectral and/or infrared camera and/or camera and/or 3D camera. The optical detection unit may be designed to detect or to record images in the NIR and/or visual range. Optical detection units may be designed to communicate with one another.

The spray nozzle unit or the spray nozzle units and the optical detection unit or the optical detection units are situated preferably at a sprayer boom of the agricultural sprayer.

The detected field section may be a detection section or a detected image section of an optical detection unit. The detected field section is preferably the entire field section detected in the field of view of the optical detection unit. Accordingly, the first field section, the second field section and the further field sections in the direction of movement as well as adjoining field sections have essentially the same length and essentially the same width. The first field section, the second field section and the further field sections form (in the direction of movement) a strip of the agricultural area.

The image information is preferably an image or a map of the detected field section.

The method is, or the method steps are, naturally carried out repeatedly. In this case, the steps of detecting the field sections are preferably carried out or repeatedly carried out in a defined, in particular, fixed time interval or in one adapted to the travel speed of the agricultural sprayer. This means, in other words, that the field sections are detected at a defined or a velocity-dependent repetition rate.

An identification of plants in an evaluation area of a piece of image information obtained from a field section may, for example, be understood to mean the determination of the presence of plants in the field section, in particular, without a classification of the individual plants taking place in the process. The step of identifying plants may include a detection of a color component, in particular of an infrared component, in the field section or image section. In this step, plants may be detected with the aid of the optical detection unit or based on a predetermined NDVI value (Normalized Differenced Vegetation Index, it is formed from reflection values in the near-infrared and visible red wavelength range of the light spectrum), by differentiating biomass or vital plants and parts of plants from the ground.

An evaluation area in this case is the area, which is evaluated for ascertaining the plant index with the aid of the control unit. The evaluation area may encompass the entire image information or the entire image, i.e., the entire detected field section. An evaluation area may, however, also encompass only a defined subarea of the image information or of the image, i.e. of the field section. The first evaluation area has essentially the same length as the detected first piece of image information preferably in the direction of movement.

The plant index may represent or be a degree of coverage of plant material and/or a quantity of plant material and/or a number of identified plants. The degree of coverage may be defined by the ratio of area covered by plant material to the entire area. The degree of coverage is accordingly the ratio of the area of the covered section to the respective entire evaluation area. For this purpose, the number of pixels in the respective evaluation area at which plant material is detected may be determined. Accordingly, a measure of the infestation may be derived with the aid of the plant index, as a function of which it is decided whether and, if necessary, how the corresponding field section is sprayed or treated.

Thus, the first plant index may represent or be a degree of coverage of the first field section of plant material and/or a quantity of plant material in the first field section and/or a number of identified plants in the first field section.

The step of identifying plants may include the step of ascertaining the plant index. The step of identifying plants and the step of ascertaining the plant index may also be carried out together (for example, if the spray agent is to be applied, once a plant is identified).

In the step of applying, a defined minimal volume of the spray agent per unit area is applied in the case of a positive "spray decision" onto the entire first field section and onto an essentially entire second field section of the agricultural area adjoining the first field section in the direction of movement of the agricultural sprayer. The field sections onto which the spray agent is applied are also referred to below as sprayed or treated field sections. In this case, the spray agent is applied preferably in the step of applying upon reaching and/or falling below and/or exceeding a defined threshold value for the first plant index. This means, in other words, that the step of applying the spray agent may include a comparison of the ascertained plant index with a threshold value, the step of applying being carried out upon reaching and/or falling below and/or exceeding the threshold value. The threshold value may be manually enterable or predefined by an external system, for example, a cloud service. A so-called spray rule, i.e., a correlation between a particular plant index and the decision whether and how much plant protection agent is to be applied, may be stored as a function of the crop in the field, of the growth stage and of the spray agent or plant protection agent used. As an example, the rule could read: "If the degree of coverage in the waste plant area >5%, then apply."

In this case, the spray agent is applied in the step of applying onto the second field section, in particular, regardless of an evaluation of a second piece of image information of the second field section, in particular, regardless of an identification of plants in a second evaluation area of the second piece of image information and/or regardless of an ascertainment of a second plant index of a second evaluation area of the second piece of image information. This means, in other words, that the spray agent is applied sweepingly also onto the second field section if the first field section has been treated beforehand.

The spray agent is preferably applied continuously or consistently in the step of applying in the direction of movement from an initial boundary of the first field section up to at least

- an end boundary of the second field section; and/or
- to the last identified plant of the further evaluation area and/or to an end boundary of the further evaluation area; and/or
- to the last identified plant of a subsequent further evaluation area and/or to an end boundary of a subsequent further evaluation area, if the spray agent has been applied essentially onto the entire previous further field section/field sections.

Accordingly, the respective spray nozzle units or the assigned valves remain essentially constantly or continuously open within the boundaries. This means, in other words, that subsequent further field sections are considered if, for example, the further (third) field section adjoining the second field section is essentially fully treated and plants requiring treatment are identified in the subsequent further (fourth) field section. In summary, spraying takes place in the first field section if needed, always in the following second field section, as far as necessary in the third field section. If, however, essentially full spraying takes place in the third field section, then as far as necessary in the fourth field section. If here too essentially full spraying takes place, then as far as necessary in the fifth field section, etc.

In this case, it is advantageous if in the step of applying the spray agent is applied uniformly onto the entire first field section and onto the entire second field section. A uniform application may be understood within the scope of the present invention to mean an application in the same or constant predefined application volume per unit area. A predefined application volume may be understood to mean an application volume established in advance or at the start of the treatment. The defined application volume may be preset or enterable in advance.

The control unit includes a processing unit for processing signals or data, at least one memory unit for storing signals or data, at least one communication interface for reading in data, in particular, for receiving pieces of image information and for outputting data, in particular, control signals to a unit, in particular, to an actuator. The processing unit may, for example, be a signal processor, a microcontroller or the like, the memory unit capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

The method according to the present invention provides an optimal operating strategy, which makes it possible to minimize the portion of field sections of an agricultural area treated with the volume shortfall in order in this way to avoid or minimize the risk of plant protection agent resistance of the plants on the agricultural area described at the outset. This is achieved, in particular, by reducing the number of contiguously sprayed field sections and thus the switch-on and switch-off processes of the nozzle unit.

It is further advantageous if the additional steps are provided:

- detecting a further field section of the agricultural area adjoining the second field section in the direction of movement with the aid of the optical detection unit in order to obtain a further piece of image information of the further field section;
- identifying plants in a further evaluation area of the further piece of image information obtained for the further field section with the aid of the control unit;
- ascertaining a further plant index of the further evaluation area using the identified plants in the further evaluation area with the aid of the control unit; and
- continuing the step of applying the spray agent in the defined minimum volume per unit area onto
  - the further field section up to at least including a last identified plant of the further evaluation area in the direction of movement; and/or
  - onto the further field section up to at least including the further evaluation area; and/or
  - onto essentially the entire further field section
- as a function of the ascertained further plant index with the aid of the spray nozzle unit of the agricultural sprayer.

In this case, it is particularly advantageous if the further evaluation area in the direction of movement has essentially the same length as or a shorter length than the detected further piece of image information. The spray agent is applied preferably in the step of continuing the step of applying upon reaching and/or falling below and/or exceeding a defined threshold value for the further plant index. The further plant index may represent, in particular, a degree of coverage of the further field section of plant material and/or an amount of plant material in the further field section and/or a number of identified plants in the further field section. In this case, the spray agent is applied preferably in the step of continuing the step of applying at a degree of coverage greater than zero and/or upon identification of at least one plant.

With the aid of this measure, it is possible on the one hand to further reduce the number of contiguously sprayed field sections and thus the switch-on and switch-off processes of the nozzle units, thereby further reducing the risk of a plant protection agent resistance of the plants in the agricultural area. This risk may be further minimized by applying the spray agent at a degree of coverage greater than zero and/or upon identification of at least one plant.

It is also advantageous if an alternative step of applying the spray agent in a defined minimum volume per unit area is provided on one of the field sections as a function of whether at least one plant in the respective field section (in this case not the adjacent field section) is identified or recognized with the aid of the control unit, and whether spray agent is applied and/or is to be applied in the adjacent field section adjoining transversely in the direction of movement with the aid of an adjacent spray nozzle unit of the agricultural sprayer.

In this case, it is particularly advantageous if in the alternative step of applying the spray agent is applied onto essentially the entire respective field section if at least one plant, in particular, of a defined size is identified or recognized in the respective field section, and spray agent is applied and/or is to be applied in the adjacent field section with the aid of the adjacent spray nozzle unit.

Since volume shortfalls may also occur transversely (to the right and to the left) to the sprayed or treated field sections, there is also the risk of resistance development. In order to reduce the risk of resistance developing in these adjacent field sections adjoining transversely to the direction of movement, the spray agent is alternatively also applied as a result of this measure onto one of the field sections if a transversely adjoining field section is treated and further at least one plant is identified or recognized at least in the respective field section.

BRIEF DESCRIPTION OF THE DRAWINGS

The present invention is explained by way of example in greater detail with reference to the figures.

FIG. 5 shows a flowchart of a method, in accordance with an example embodiment of the present invention.

DETAILED DESCRIPTION OF EXAMPLE EMBODIMENTS

Figure 1:
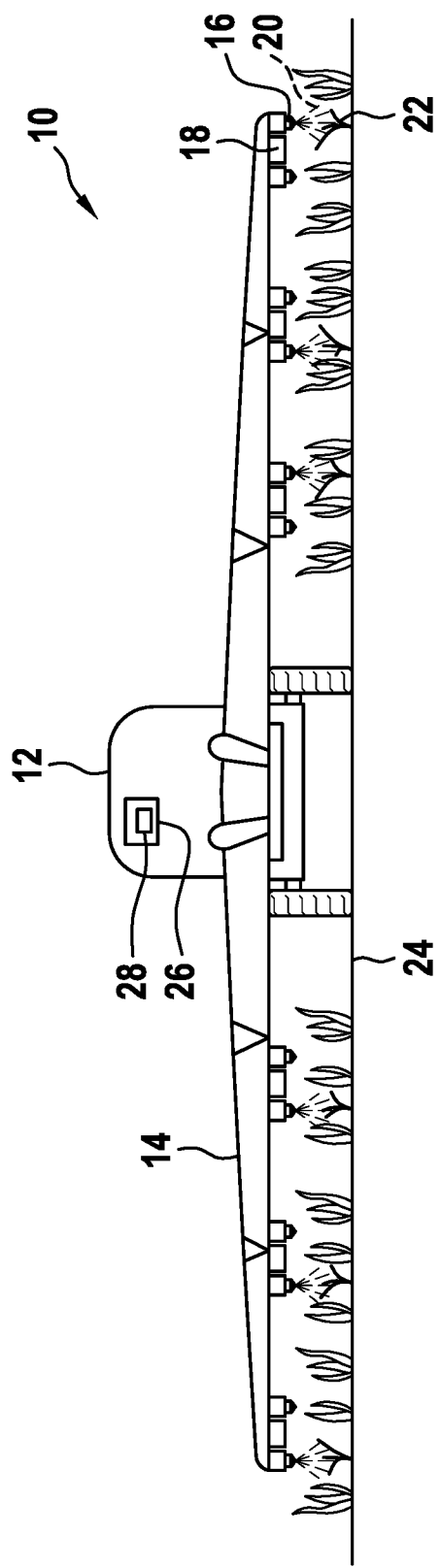
FIG. 1 schematically shows a representation of an agricultural sprayer, in accordance with an example embodiment FIG. 2 schematically shows a representation of field sections of an agricultural area for explaining an operating strategy, in accordance with an example embodiment of the present invention.

In the following description of preferred exemplary embodiments of the present invention, identical or similar reference numerals are used for elements which are represented in the various figures and act similarly, a repeated description of the elements being omitted.

A schematic representation of an agricultural sprayer is shown in FIG. 1, which is provided in its entirety with reference numeral 10.

Agricultural sprayer 10 is designed as field sprayer 10. Field sprayer 10 is situated at a mobile farm vehicle 12, which is designed as a tractor truck 12 or tractor 12.

Agricultural sprayer 10 includes a spray boom 14. Spray nozzle units 16 and optical detection units 18 are situated at spray boom 14. Spray nozzle units 16 are designed to apply a spray agent 20 onto plants 22 or waste plants 22 of an agricultural area 24. Optical detection units 18 are designed as optical cameras 18. Optical cameras 18 each include a filter unit in order to extract a color component such as, for example, the red color component of an obtained or detected piece of image information or of a detected image, in order to detect plants 22 or waste plants 22.

Agricultural sprayer 10 further includes a delivery unit (not shown), with the aid of which the application volume or an active ingredient volume is adjustable or variable in spray agent 20 to be applied.

Agricultural sprayer 10 also includes a control unit 26, which is connected to optical cameras 18 in order to receive pieces of information from the latter. Control unit 26 includes a processing unit 28, which is designed to carry out calculation steps or image processing steps for carrying out the method according to the present invention. Control unit 26 is further designed to output a control signal in such a way that spray agent 20 is applied with the aid of spray nozzle units 16 as a function of the ascertained plant index.

Figure 2:
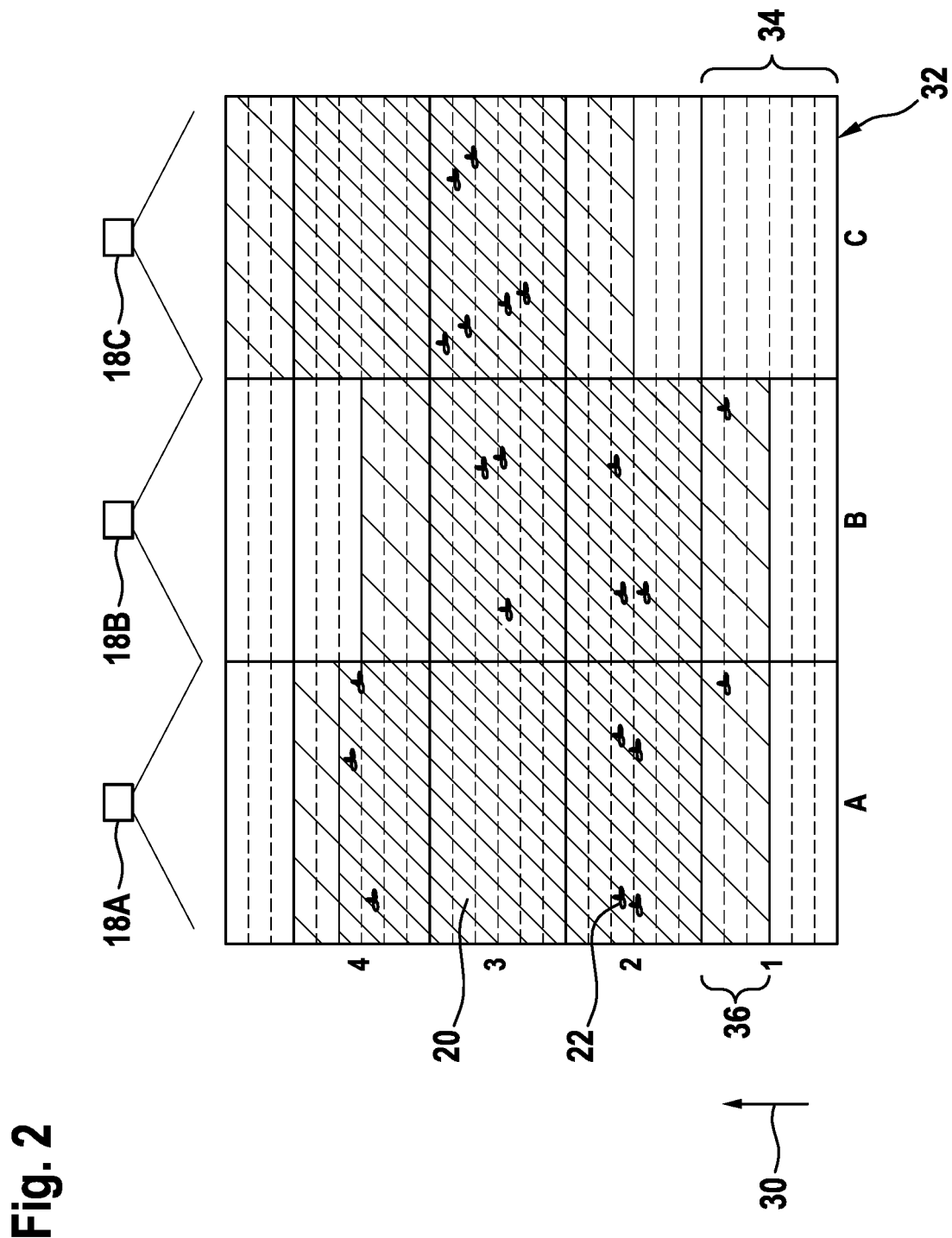

To illustrate the method or the operating strategy, FIG. 2 shows a detail of agricultural area 24, which has been detected with the aid of three optical detection units 18A, 18B, 18C (18A through 18C) or cameras 18A, 18B, 18C (18A through 18C) of agricultural sprayer 10 during a pass of agricultural sprayer 10 in the direction of movement 30. Cameras 18A through 18C are situated next to one another at spray boom 14 transversely to direction of movement 30. In this case, field sections A1, A2, A3, A4 (A1 through A4) have been detected with the aid of camera 18A, field sections B1, B2, B3, B4 (B1 through B4) have been detected with the aid of camera 18B and field sections C1, C2, C3, C4 (C1 through C4) with the aid of camera 18C.

Field sections A1, B1, C1 have initially been detected, one piece of image information 32 or image 32 having been generated in each case. In one evaluation area 34 of respective obtained piece of information 32, which includes entire respective image 32 or entire respective field sections A1, B1, C1 in the exemplary embodiment shown, plants 22 have then been searched with the aid of a control unit 26 in order in each case to ascertain a plant index and to apply as a function thereof spray agent 20 in a defined minimum volume per unit area according to the operating strategy. In the exemplary embodiment shown, the plant index is a number of identified plants 22, the threshold value on three plants having been defined. This means, in other words, that upon identification of three or more plants 22 in one evaluation area 34, spray agent 20 is applied with the aid of corresponding spray nozzle unit 16 or a positive "spray decision" is present. No plants were identified in any of field sections A1, B1, C1, which is why spray agent 20 has not been applied in the defined minimum volume per unit area onto field sections A1, B1, C1.

Similarly, field sections A2, B2, C2 adjoining in direction of movement 30 have been subsequently detected. As is apparent from FIG. 2, spray agent 20 has been applied in a defined minimum volume per unit area onto essentially entire field section A2 and onto essentially entire field section B2 with the aid of corresponding spray nozzle unit 16, but not onto field section C2. This is due to the fact that the plant index or the number of identified plants 22 in field sections A2, B2 reaches or exceeds the threshold value.

In order to now reduce the number of contiguously sprayed field sections and thus the proportion of the field sections treated with a volume shortfall, spray agent 20 has further been "sweepingly" applied also onto essentially entire field sections A3, B3 adjoining treated field sections A2, B2 in the direction of movement 30, regardless of whether or not the plant index there has been exceeded (no plants 22 have been identified in field section A3). In this case, field sections A2, A3 and B2, B3 have been continuously sprayed or treated with the aid of corresponding spray nozzle unit 16. Since the plant index in evaluation area 34 of image 32 of field section C3 has been exceeded, spray agent 20 has also been applied onto entire field section C3.

Next, field sections A4, B4, C4 adjoining in direction of movement 30 have been detected. Similar to the above-explained approach, the spray agent has also been "sweepingly" applied in the defined minimum volume per unit area onto field section C4, even though no plants 22 have been identified there. In this case as well, field section C3, C4 has been continuously sprayed or treated with the aid of corresponding spray nozzle unit 16.

According to one preferred specific embodiment of the method, a plant index of evaluation area 34 of image 32 of subsequently detected adjoining field section A4, B4 has again been ascertained following the step of "sweepingly" applying spray agent 20. This plant index may be different from the aforementioned one or may have a different threshold value. The exemplary embodiment shown, however, involves the same plant indices and threshold values. Since no plant 22 has been identified in field section B4, spray agent 20 has not been applied there in the defined minimum volume per unit area. In evaluation area 34 of image 32 of field section A4, however, the threshold has been exceeded, so that the step or the process of applying spray agent 20 in the defined minimum volume per unit area onto field section A4 has been continued. In contrast to the two previously treated field sections A2, A3, which have been essentially fully sprayed, spray agent 20 has been applied in field section A4 according to the operating strategy only up to and including last identified plant 22 in direction of movement 30.

To illustrate the problem of volume shortfall, areas 36 in which volume shortfalls have been applied are further represented or marked in FIG. 2.

Figure 3A:
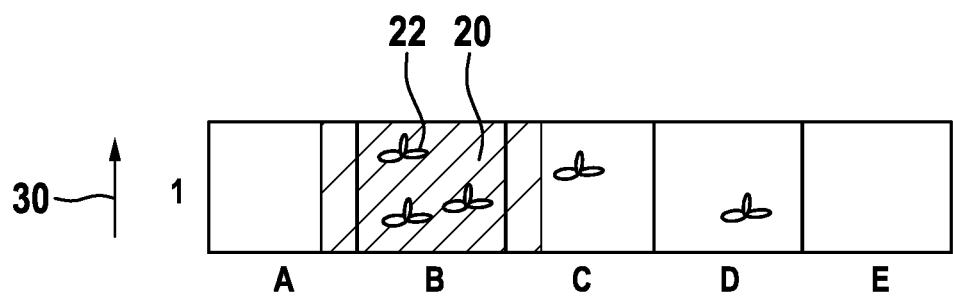
FIGS. 3A and 3B schematically show a representation of field sections for explaining one further specific embodiment of the operating strategy, in accordance with the present invention.
Figure 3B:
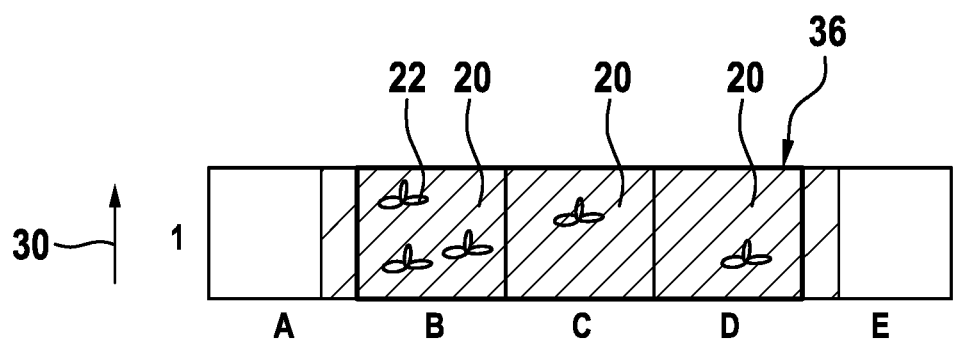
Figure 4A:
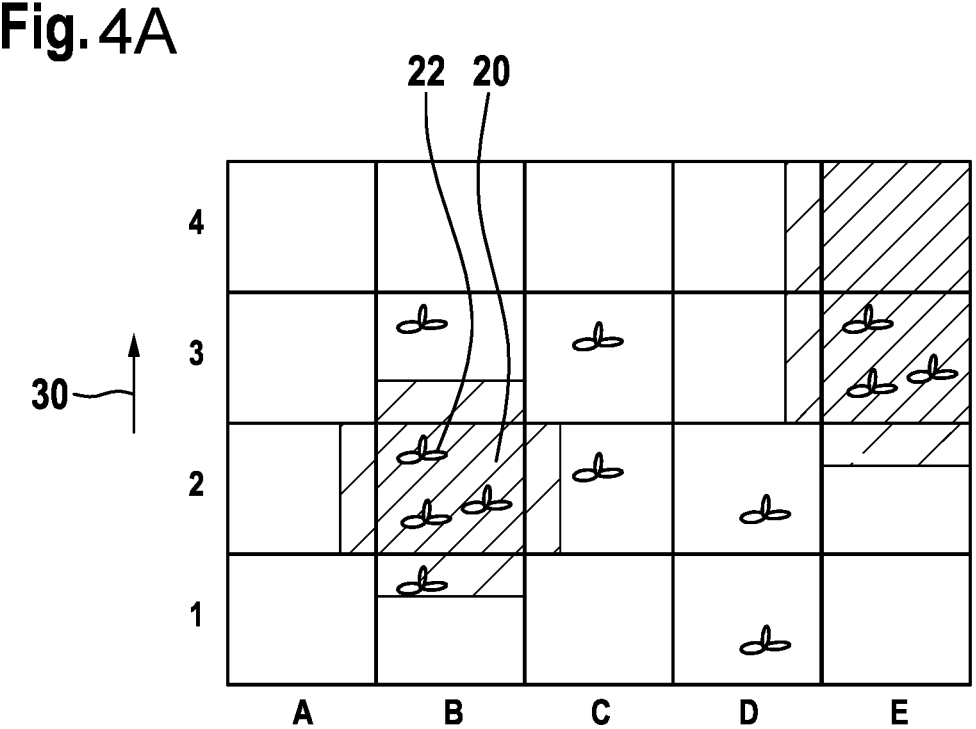
FIGS. 4A and 4B schematically show a representation of field sections for explaining one further specific embodiment of the operating strategy, in accordance with the present invention.
Figure 4B:
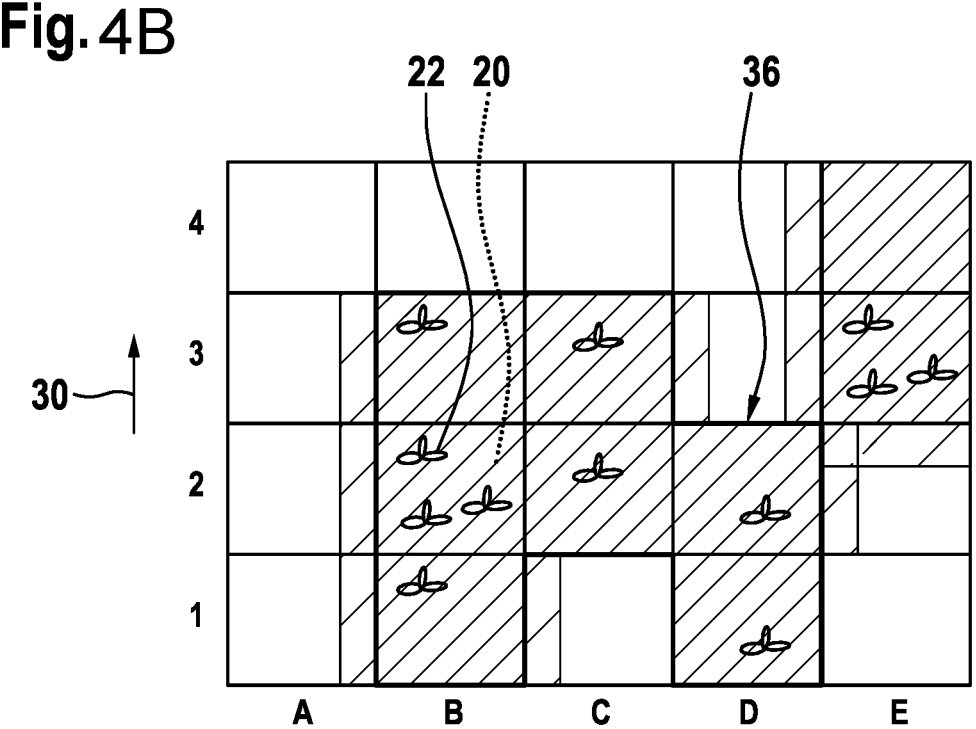

FIGS. 3A, 3B show field sections A1, B1, C1, D1, E1 (A1 through E1) situated next to one another and detected in each case with the aid of an optical detection unit 18 as a comparison of the above-explained operating strategy and of a further specific embodiment of the operating strategy. The threshold here for the number of identified plants 22, from which spray agent 20 is applied, is also three plants 22. In the operating strategy according to FIG. 3A, the application of spray agent 20 takes place regardless of what occurs in field section A1 through E1 adjoining transverse to the direction of movement 30. Thus, spray agent 20 has been applied in the defined minimum volume per unit area only onto field section B1.

In contrast, the operating strategy shown according to FIG. 3B provides that, alternatively, spray agent 20 is also applied in the defined minimum volume per unit area onto one of field sections A1 through E1 when at least one plant 22 is identified in respective field section A1 through E1 and spray agent 20 is applied and/or is to be applied in a field section A1 through E1 adjoining transversely to direction of movement 30. Thus, spray agent 20 has been further applied in the defined minimum volume per unit area onto field sections C1 and D1 with the aid of one spray nozzle unit 16 each.

Similar to the operating strategies according to FIGS. 3A, 3B, FIGS. 4A, 4B illustrate the comparison of the two operating strategies, for further minimizing the risk of a plant protection agent resistance, the threshold for the number of identified plants 22 from which spray agent 20 is applied in the defined minimum volume per unit area onto a field section A1 through 4, B1 through 4, C1 through 4, D1 through 4, E1 through (A1 through E4) having been established here at one plant 22.

FIG. 5 shows a flowchart of a method 100 for applying a spray agent 20 onto an agricultural area 24 with the aid of a spray nozzle unit 16 of an agricultural sprayer 10. Method 100 includes a step of detecting 102 a first field section A1 through E4 of agricultural area 24 with the aid of an optical detection unit 18, 18A through C, in order to obtain a first piece of image information 32 from first field section A1 through E4. Method 100 further includes a step of identifying 104 plants 22 in a first evaluation area 34 of first piece of image information 32 obtained from first field section A1 through E4 with the aid of a control unit 26. Method 100 also includes a step of ascertaining 106 a first plant index of first evaluation area 34 using identified plants 22 in first evaluation area 34 with the aid of control unit 26. The method further includes a step of applying 108 spray agent 20 in a defined minimum volume per unit area onto essentially entire first field section A1 through E4 and onto an essentially entire second field section A1 through E4 adjoining first field section A1 through E4 in direction of movement 30 of agricultural sprayer 10 as a function of the first plant index ascertained for first evaluation area 34 with the aid of spray nozzle unit 16 of agricultural sprayer 10.

Method 100 optionally or preferably further includes an additional step of detecting 110 a further field section A1 through E4 of agricultural area 24 adjoining second field section A1 through E4 in direction of movement 30 with the aid of optical detection unit 18, 18A through 18C, in order to obtain a further piece of image information 32 of further field section A1 through E4; an additional step of identifying 112 plants 22 in a further evaluation area 34 of further piece of image information 32 obtained from further field section A1 through E4 with the aid of control unit 26; an additional step of ascertaining 114 a further plant index of further evaluation area 34 using identified plants 22 in further evaluation area 34 with the aid of control unit 26; and an additional step of continuing 116 the step of applying 108 spray agent 20 in the defined minimum volume per unit area onto further field section A1 through E4 up to at least including a last identified plant 22 of further evaluation area 34 in direction of movement 30; and/or onto further field section A1 through E4 up to at least including further evaluation area 34; and/or onto essentially entire further field section A1 through E4 as a function of the ascertained further plant index with the aid of spray nozzle unit 16 of agricultural sprayer 10.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for applying a spray agent onto an agricultural area using a spray nozzle unit of an agricultural sprayer, the method comprising:
   detecting a first field section of the agricultural area using an optical detection unit to obtain a first piece of image information from the first field section;
   identifying, using a control unit, plants in a first evaluation area of the first piece of image information obtained from the first field section;
   ascertaining, using the control unit, a first plant index of the first evaluation area using the plants identified in the first evaluation area; and
   applying, using the spray nozzle unit of the agricultural sprayer, the spray agent in a defined minimum volume per unit area onto the entire first field section and onto an entire second field section of the agricultural area adjoining the first field section in a direction of movement of the agricultural sprayer as a function of the first plant index ascertained for the first evaluation area.

2. The method as recited in claim 1, wherein in the applying step, the spray agent is applied onto the second field section regardless of an evaluation of a second piece of image information of the second field section, and regardless of an identification of plants in a second evaluation area of the second piece of image information and/or of an ascertainment of a second plant index of a second evaluation area of the second piece of image information.

3. The method as recited in claim 1, wherein the first evaluation area in the direction of movement has the same length as the detected first piece of image information.

4. The method as recited in claim 1, further comprising:
   detecting, using the optical detection unit, a further field section of the agricultural area adjoining the second field section in the direction of movement, to obtain a further piece of image information of the further field section;
   identifying, using the control unit, plants in a further evaluation area of the further piece of image information obtained for the further field section;
   ascertaining, using the control unit, a further plant index of the further evaluation area using the identified plants in the further evaluation area; and
   continuing the step of applying the spray agent in the defined minimum volume per unit area onto:
      the further field section up to at least including a last identified plant of the further evaluation area in the direction of movement, and/or
      the further field section up to at least including the further evaluation area; and/or
      the entire further field section,
   as a function of the ascertained further plant index, using the spray nozzle unit of the agricultural sprayer.

5. The method as recited in claim 4, wherein the further evaluation area has the same length or a shorter length in the direction of movement than the detected further piece of image information.

6. The method as recited in claim 4, wherein in the step of applying, the spray agent is applied continuously in the direction of movement at least from an initial boundary of the first field section up to at least:
   an end boundary of the second field section; and/or
   a last identified plant of the further evaluation area and/or to an end boundary of the further evaluation area; and/or
   a last identified plant of a subsequent further evaluation area and/or to an end boundary of a subsequent further evaluation area, when the spray agent has been applied onto the entire further field section.

7. The method as recited in claim 4, wherein:
   the spray agent is applied, in the step of applying, upon reaching and/or falling below and/or exceeding a defined threshold value for the first plant index, and/or
   the step of continuing the step of applying, the spray agent is applied upon reaching and/or falling below and/or exceeding a defined threshold value for the further plant index.

8. The method as recited in claim 4, wherein:
   the first plant index represents a degree of coverage of the first field section of plant material and/or a quantity of plant material in the first field section and/or a number of identified plants in the first field section, and/or
   the further plant index represents a degree of coverage of the further field section of plant material and/or a quantity of plant material in the further field section and/or a number of identified plants in the further field section.

9. The method as recited in claim 8, wherein in the step of continuing the step of applying, the spray agent is applied at a degree of coverage greater than zero and/or upon identification of at least one plant.

10. The method as recited in claim 4, wherein the first field section and the further field section have the same length and the same width in the direction of movement.

11. The method as recited in claim 1, wherein the applying the spray agent in the defined minimum volume per unit area onto the first field section is performed as a function of whether:
   at least one plant is identified in the first field section using the control unit, and
   the spray agent is applied and/or is to be applied in an adjacent field section adjoining transversely to the direction of movement using an adjacent spray nozzle unit of the agricultural sprayer.

12. The method as recited in claim 11, wherein in the step of applying, the spray agent is applied onto the entire first field section, if in the first section at least one plant of a defined size is identified, and the spray agent is applied and/or is to be applied in the adjacent field section using the adjacent spray nozzle unit.

13. An apparatus, comprising:
   an optical detection unit configured to detect a first field section of an agricultural area to obtain a first piece of image information from the first field section;
   a control unit, which is connected to the optical detection unit, and which is configured to perform the following:
      identifying plants in a first evaluation area of an obtained first piece of image information for the first field section of the agricultural area detected using the optical detection unit;
      ascertaining a first plant index of the first evaluation area using the plants identified in the first evaluation area, wherein first plant index represents: (i) a degree of coverage of plant material in the first evaluation area, and/or (ii) a quantity of plant material in the first evaluation area, and/or (iii) a count of identified plants in the first evaluation area; and
      outputting a control signal to a spray nozzle unit of an agricultural sprayer as a function of the first plant index ascertained for the first evaluation area, the control signal to control at least one spray nozzle unit to apply a spray agent in a defined minimum volume per unit area onto the entire first field section and onto an essentially entire second field section of the agricultural area adjoining the first field section in the direction of movement of the agricultural sprayer.

14. An agricultural sprayer for applying a spray agent onto an agricultural area, comprising:
   at least one spray nozzle unit;
   at least one optical detection unit configured to detect a first field section of an agricultural area to obtain a first piece of image information from the first field section; and
   a control unit, which is connected to the at least one optical detection unit, and which is configured to perform the following:
      identifying plants in a first evaluation area of an obtained first piece of image information for the first field section of the agricultural area detected using the optical detection unit;
      ascertaining a first plant index of the first evaluation area using the plants identified in the first evaluation area, wherein first plant index represents: (i) a degree of coverage of plant material in the first evaluation area, and/or (ii) a quantity of plant material in the first evaluation area, and/or (iii) a count of identified plants in the first evaluation area; and
      outputting a control signal to the spray nozzle unit as a function of the first plant index ascertained for the first evaluation area, the control signal to control at least one spray nozzle unit to apply a spray agent in a defined minimum volume per unit area onto the entire first field section and onto an essentially entire second field section of the agricultural area adjoining the first field section in a direction of movement of the agricultural sprayer.

15. The apparatus as recited in claim 13, wherein the control unit is further configured to perform the following:
   applying the spray agent onto the second field section regardless of an evaluation of a second piece of image information of the second field section, and regardless of an identification of plants in a second evaluation area of the second piece of image information and/or of an ascertainment of a second plant index of a second evaluation area of the second piece of image information.

16. The apparatus as recited in claim 13, wherein the first evaluation area in the direction of movement has the same length as the detected first piece of image information.

17. The apparatus as recited in claim 13, wherein the control unit is further configured to perform the following:
   detecting, using the optical detection unit, a further field section of the agricultural area adjoining the second field section in the direction of movement, to obtain a further piece of image information of the further field section;
   identifying, using the control unit, plants in a further evaluation area of the further piece of image information obtained for the further field section;
   ascertaining, using the control unit, a further plant index of the further evaluation area using the identified plants in the further evaluation area, wherein the further plant index represents: (i) a degree of coverage of plant material in the further evaluation area, and/or (ii) a quantity of plant material in the further evaluation area, and/or (iii) a count of identified plants in the further evaluation area; and
   applying the spray agent in the defined minimum volume per unit area onto:
      the further field section up to at least including a last identified plant of the further evaluation area in the direction of movement, and/or
      the further field section up to at least including the further evaluation area; and/or
      the entire further field section,
   as a function of the ascertained further plant index, using the spray nozzle unit of the agricultural sprayer.

18. The apparatus as recited in claim 17, wherein the further evaluation area has the same length or a shorter length in the direction of movement than the detected further piece of image information.

19. The apparatus as recited in claim 17, wherein the spray agent is applied continuously in the direction of movement at least from an initial boundary of the first field section up to at least:
   an end boundary of the second field section; and/or
   a last identified plant of the further evaluation area and/or to an end boundary of the further evaluation area; and/or
   a last identified plant of a subsequent further evaluation area and/or to an end boundary of a subsequent further evaluation area, when the spray agent has been applied onto the entire further field section.

20. The apparatus as recited in claim 17, wherein:
   the spray agent is applied upon reaching and/or falling below and/or exceeding a defined threshold value for the first plant index, and/or
   the spray agent is applied upon reaching and/or falling below and/or exceeding a defined threshold value for the further plant index.

21. The apparatus as recited in claim 14, wherein the first plant index represents the degree of coverage of plant material in the first evaluation area, wherein the degree of coverage of plant material is a ratio of an area covered by the plant material to the entire first evaluation area.

* * * * *